United States Patent [19]

Hau

[11] Patent Number: 4,731,546

[45] Date of Patent: Mar. 15, 1988

[54] AUTOMATIC ELECTRIC DIRECTION ALARMING CONTROL ADAPTED TO A CAR, A MOTORCYCLE OR OTHER LAND VEHICLE

[76] Inventor: Chung T. Hau, 21, Sublane 7, Lane 301, Li Jen Rd., Tainan, Taiwan

[21] Appl. No.: 937,469

[22] Filed: Dec. 2, 1986

Related U.S. Application Data

[63] Continuation of Ser. No. 637,576, Aug. 3, 1984, abandoned.

[51] Int. Cl.⁴ .............................................. B60Q 1/34
[52] U.S. Cl. .................. 307/10 LS; 340/67; 340/73; 315/79
[58] Field of Search ............ 307/9, 60 R, 10 CS, 307/120; 340/62, 67, 73, 74; 315/79, 81

[56] References Cited

U.S. PATENT DOCUMENTS

| | | | |
|---|---|---|---|
| 3,496,535 | 2/1970 | Tyzack | 340/62 X |
| 3,829,828 | 8/1974 | Hutchinson et al. | 307/10 LS X |
| 4,128,770 | 12/1978 | Okazaki | 307/10 LS |
| 4,258,292 | 3/1981 | Kassfeldt | 307/10 LS X |
| 4,333,071 | 6/1982 | Kira et al. | 307/10 LS X |

FOREIGN PATENT DOCUMENTS

| | | | |
|---|---|---|---|
| 39868 | 3/1980 | Japan | 340/62 |
| 77238 | 5/1982 | Japan | 340/62 |

Primary Examiner—Philip H. Leung
Assistant Examiner—Derek S. Jennings
Attorney, Agent, or Firm—Cushman, Darby & Cushman

[57] ABSTRACT

Automatic electronic direction alarming control for adaptation to a car, a motorcycle or other land vehicles, more specifically it means the provising of an alarming control which will release a flashing indication as a function of the speed of the vehicle, meant to enhance traffic safety by the prevention of collision by other traffic owing to misjudgement with regard to the active condition of a preceding traffic, and which consists essentially of ICs, switching transistors, RC circuits whose time constant serves to control the direction lights.

8 Claims, 5 Drawing Figures

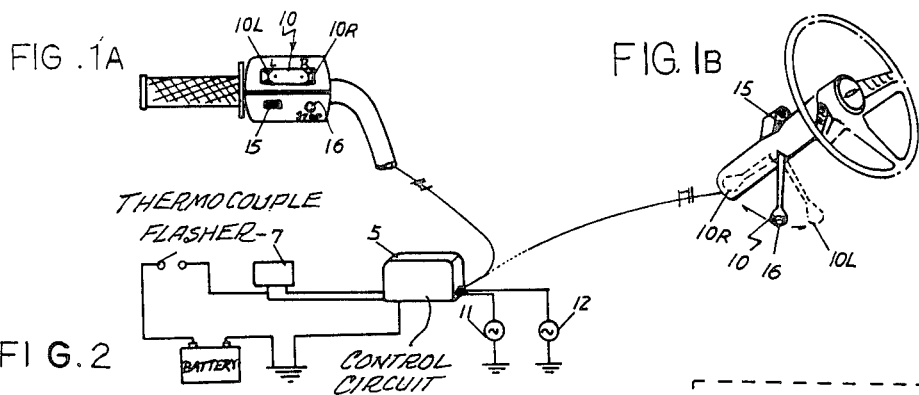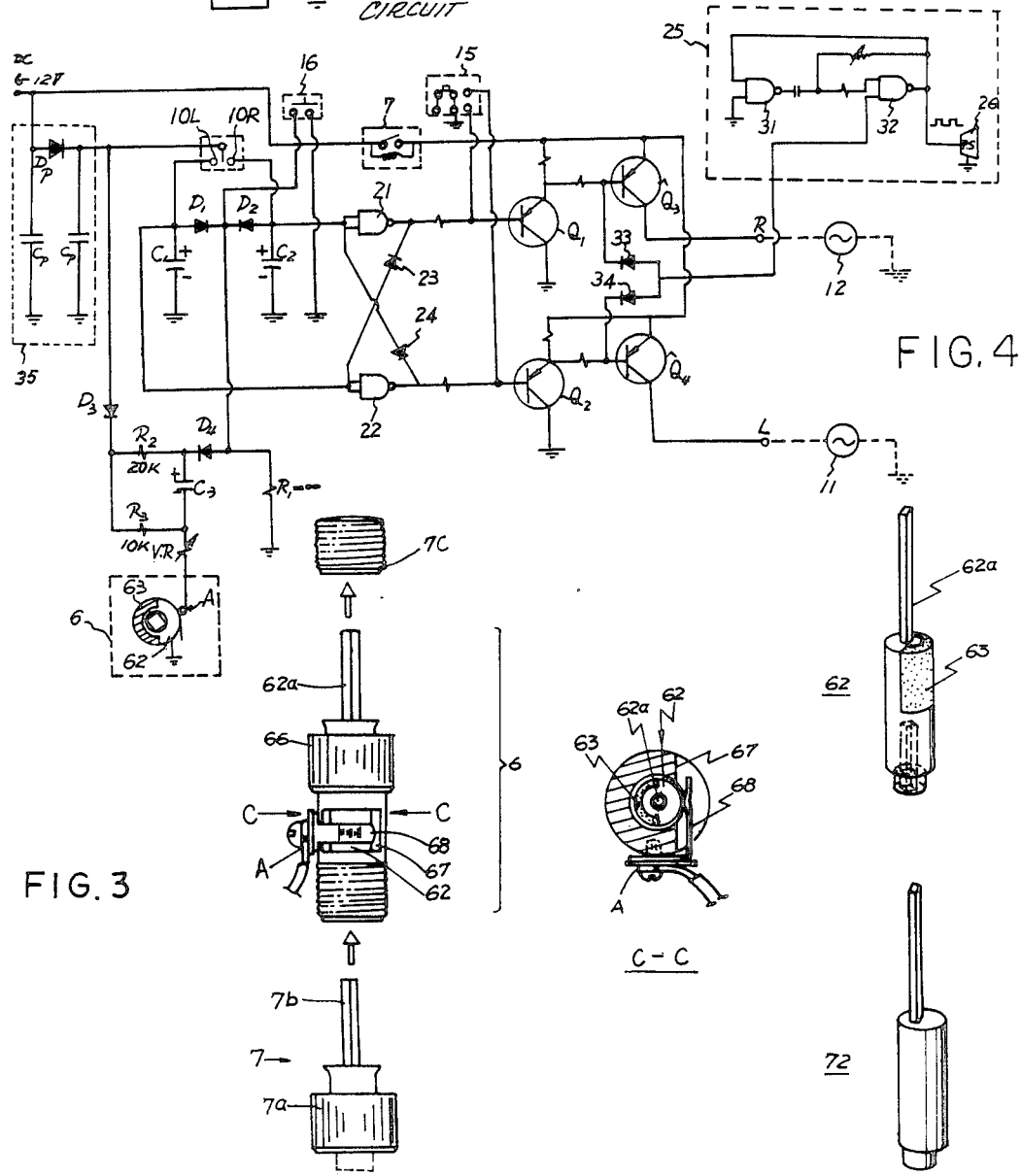

AUTOMATIC ELECTRIC DIRECTION ALARMING CONTROL ADAPTED TO A CAR, A MOTORCYCLE OR OTHER LAND VEHICLE

This is a continuation of application Ser. No. 637,576, filed Aug. 3, 1984, which was abandoned upon the filing hereof.

SUMMARY OF THE INVENTION

The present invention provides for an automatic electronic direction alarming control and device, characterised in the provision of an RC circuit comprising a resistor and capacitors and a grounding switch, which permits adjustment of the time constant in response to the speed of the vehicle in travel, thereby achieving control of the flashing period of the direction lights of the same vehicle provided therewith.

It is common practice for most cars and motorcycles to have indicator lights, otherwise called directional lights, installed on both sides of the body, which are used to indicate the driver's intention to turns, change lanes or make pass another vehicles. Misuse or malfunctioning of such indicator lights whilst the vehicle is moving can often result in misjudgement by traffic proceeding in your direction or trailing behind you, and the further eventuality accidents and casualties, in addition to time delays and material damages and losses. This effect is of course well known to all the drivers anywhere. In short, the quality level of an indicator light, good or bad, will have a vital influence on traffic safety. One indicia of evaluation of an indicator light is the ease with which the driver can exercise control of the indicator light. As a matter of fact, to-date most indicator lights, whether on a car or on a motorcycle, are typically controlled by mechanical methods through simple on off settings. For instance, the mechanical control switch of a car is activated by the steering angle produced by the steering lever which is typically provided down the steering wheel, as indicated by reference number 10 in FIG. 1, to the effect that the right indicator light will turn on when the steering goes one way to broken line position 10R, and that the left indicator light will turn on when the steering goes the other way to broken line position 10L, and the switch will rebound as the steering wheel is turned further in either direction as the case may be. However, the gear lever 10 will fail to resume position automatically when the steering angle is inadequate in cases like overtaking or changing traffic lanes, and in such cases it is necessary to reset the gear lever 10 manually. Thus, the indicator light will continue flashing and will mislead succeeding traffic to make a wrong judgement that would very likely lead to collision incidents. On the other hand, a driver concentrating his attention to the switching of the indicator lights will often fail to adequately watch the traffic conditions and therefore endangering traffic safety. The same reasoning will apply to a motorcycle driver because the provision of indicator control on a motorcycle is the similar to case of a car, both of the manual, mechanical mode of execution.

It is in recognition of the failure to provide for an automatic resetting of conventional indicator light control such as those recited in the foregoing, that which is impractical for use and will affect traffic safety in every possibility, the inventor started to work, and eventually with success, on a new direction indication control that will remove all the devised direction indication control, and remove all defects known heretofore of like products. This is the primary object of the present invention.

A further object of the present invention titled automatic electronic direction alarming control adapted to a car, a motorcycle and other land vehicles, it is to provide for easy adjustment of the flashing period of the indicator light of a vehicle provided accordingly as required or as a function of the vehicle speed en route so that traffic safety may be promoted.

DESCRIPTION OF THE DRAWINGS

FIG. 1A and FIG. 1B illustrate two different embodiments of the invention titled automatic electronic direction alarming control adapted to a car, a motorcycle or other land behicles;

FIG. 2 is a circuit diagram of the control according to the invention;

FIG. 3 is a fragmentary analytical view of the grounding switch as an auxiliary unit of the control according to the invention and FIG. 4 shows a detailed diagram of the circuit

DETAILED DESCRIPTION

Referring to FIG. 1A, a perspective view of the invention in one embodiment to be adapted to a car, incorporates the control circuit box 5 whose working principle will be explained later in the text, which serves to control the flashing period of the indicator light as well as the off period, which can be a function of the car's travelling speed. Also, associated units such as a thermocouple flasher 7 operates to blink the indicator to stress the alarming effects, and a self-resetting gear lever 10 which allows the use of either indicator light 11 or 12. More specifically, the right indicator light 12 will turn on as the gear lever 10 is shifted to position 10R, and left indicator light will turn on as the same is shifted to position 10L. A sliding switch 15 as provided down the steering wheel to set both the right and the left indicator lights to flash concurrently in case of passing or intention to park. A stop button 16 as provided on top of the gear lever 10 to turn a flashing indicator light off, the other embodiment, shown in FIG. 1B for the invention as illustrated share exactly the same performance as the one just described, the only difference being in the location of the control units.

As regards the control box 5, referring to FIG. 4 it is seen that the input section comprises an RC circuit incorporating capacitor C1, C2 and open resistor R1. A high voltage, high frequency, filtering protection loop 35 consists of capacitor and diode Cp, Dp to guard against the high voltage surge which occurs when the vehicle starts up the engine running. The circuit is designed such that diode D4 cuts off when the vehicle is at rest, whereupon the time constant resulting from the interaction of capacitor C1 or C2 with resistor R1 will be infinite, so that indicator 12 will flash continually. Another RC circuit comprises C3, R2, R3 and VR, whose discharging frequency is determined by the time constant thereof and the operating frequency of the grounding switch 6, which is a function of the vehicle speed. This working principle will be explained later in the text. This second RC circuit will function to change the time constant of the first RC circuit as of R1C1 or R1C2. In short, the ability to change the flashing period of the indicator lights in response to a change in vehicle speed according to the invention is achieved by these two RC circuits in which the output of R1c circuit is fed to the input of two inverter gates 21, 22 formed of NAND GATES, the output of each inventer gate being cross-coupled by a diode 23, 24. The output of each inverter is fed back to the input of the other inverter gates respectively so that the outputs of the two reverse gates 21, 22 will affect the logic state of the other. Thus, inverters 21 and 22 will not both have a high or a low voltage at the same time. The output goes to a switching circuit composed of four switching transistors Q1, Q2, Q3 and Q4, each of which control a flashing indicator light to rapidly turn on or off. There is also provided an additional circuit composed of two NAND gates 31, 32 and RC components. This circuit is driven by two diodes 33, 34 from the bases of the switching transistors Q3, Q4. This circuit serves to release a harmonious sound via speak 26.

Once the invention device is installed in a vehicle, while the gear lever 10 (which is used to assume control of the indicator lights) remains inactivated, referring to FIG. 1 and FIG. 2, it will be seen that the input terminals of the inverter gates 21, 22 of an IC are both grounded, to be at low potential, transistors Q1, Q2, Q3, Q4 are off, and indicator lights 11, 12 are off. The working principle will be given in further details:

1. When the vehicle speed is zero, the grounding switch 6, which is dependent on the vehicle speed remains passive and capacitor C3 is charged to saturation via diode D3 and resistor R2, but has no discharge path. As a result, D4 will be reverse biased. When the gear level 10 is shifted to position 10L, then capacitor C1 starts charging, providing a high input to the inverter gate 22. Thus, the output of inverter 22 is low. PNP transistor Q2, Q4 thus start conduction, causing left indicator 11 to light up in intermittent flashes through thermocouple flasher 7. This flashing goes on as long as capacitor C1 remains charged and while D4 continues to be revised biased. However, an intermittent discharging of C3 takes place in response to an intermittent grounding of point a relative to the grounding switch 6 once the vehicle starts engine running. C3 voltage is lowered to a critical value, D4 will be brought in to conduction from its cut off condition, draining off the voltage on C1 at C3 via D1 and D4, and the voltage across C3 draining off via R2, R3, VR. After several cycles, capacitor C1 drops to a low potential, causing indicator light 11 to stop flashing. The same principle applies to the right indicator light 10R.

2. When the vehicle is travelling, the grounding switch 6 will ground intermittently in proportion to vehicle speed, causing C3 to charge and discharge intermittently in like measure. In summary by pressing the left side switch 10L, capacitor C1 will start charging, causing a high input to the inverter gate 22, and a low output, P type transistors Q2, Q4 being set to conduction, indicator 11 lighting up, and capacitor C1 charged to saturation, draining off via D1, D4 to C3. A faster vehicle speed will cause more discharging sequences of C3, meaning an increase in the frequency of conduction of D4, and a concomitant discharging speed of C1. Thus, flashing period of the indicator light will be shortened. Conversely, the discharging will take a longer period when vehicle speed goes as low as 30 to 40 km per hour or less. The flashing will last for about 18 to 25 second in this instance, but when the vehicle is making a turn at a speed of 30 to 40 km per hour or so, the driver may effect an adjustment of the VR, a variable resistor, to set the flashing period to 10 or 15 seconds.

3. In the event that it is necessary to rapidly change an active flashing left indicator light 11 all to an active indication of the right indicator light, merely turning the gear lever to directly to position 10R, will cause a working voltage for the left indicator to be cut off forth with in response to the activation of D23, D24 in the feedback loop. In case of mishandling, by depressing stop button 16 to bypass the voltage built in capacitors C1, C2, will turn off the indicator lights immediately.

4. The period in which an indicator light will blink depends on the active value of the variable resistor VR, the period can be set to 8 to 18 seconds, for instance.

5. Sliding switch 15 provides for concurrent activation of both indicator lights without a maximum period of activation, is meant for use in overtaking or parking warning, and which, once grounded, will set all the switching crystals Q1, Q2, Q3, Q4 to conduction, so that indicator lights 11, 12 will flash continuously till the switch turned off.

6. For many position to which the gear lever shifts in making a turn of the vehicle, the indicator light involved will flash for about 10 seconds, adjustable at the driver's option, and turn off thereafter.

The grounding switch 6 as dependent on the vehicle speed as seen in FIG. 3, is actually provided by having a switching device incorporated in the tachometer 7 already provided in the vehicle, a car or a motorcycle. The speedometer shall have been fitted by a fixed screwnut 7a to the threaded bore 7c thereof prior to the mounting of the grounding switch 6. The base of the meter shaft 7b is sleeved to the transmission shaft of the vehicle, not shown in the drawings, and the front end of the meter shaft 7b is inserted in a gear unit incorporated in the speedometer meant to give an exact indication of the vehicle speed at any time. The additionally provided switch 6 lies between the screwnut 7a and the threaded bore 7c, which includes a hollow tubular section 66 and a square metal rotation shaft 62 contained therein, midway to the tubular section bearing against the rotation shaft 62, one end of the spring 68 being in contact with wiring of the control circuit at point A. The middle section of the metal rotation shaft 62 is stripped off a suitable width by semicircular rounding by 180 degrees, so than an insulator 63 can be symmetrically located hereground, so that when the speedmeter shaft 7b drives square shaped rotate shaft 62 to rotation, which in turn drives the gear unit in the speedmeter to yield an indication of the vehicle speed, contact of the conductive spring 68 with the rotation shaft 62 in rotation will reflect half-cycle contact with insulator 63. An open circuit will reflect point a on the conductor and, for the next half cycle contact will be made on the square shaped metal rotation shaft 62 reflecting a grounding with repect to point A. Thus, as the vehicle increases its speed, rotation of the rotation shaft 62 will increase in like measure, and point A relative to the grounding switch 6 will shift between grounding and open more frequently. As a result the discharging frequency of capacitor in the RC circuit will increase in proportion. The same effects will be achieved by replacing said square shaped rotation shaft by a cam shaft 72.

Presumably the grounding frequency of the grounding switch 6 should increase as vehicle speeds increases, and that the charging/discharging frequency in the RC circuit should be in synchronism with the grounding frequency. In practice, due to restrictions of the time constant of RC components charging and discharging frequency in the RC circuit will terminates its increase upon reaching a critical saturation condition defined by and as dependent on the particular values of the RC components in use. In application, this means that the flashing period will not approach zero regardless of the prevailing vehicle speed. For instance, if the flashing period of a vehicle speed, is set at 10 seconds at speeds around 40 km per hour, and that the same is set to 7 seconds at speeds up to 100 km per hour, nearly corresponding to the saturation limit of the charging/discharging frequency of the RC circuit, then the flashing period will last for 7 or 6 seconds notwithstanding that the vehicle speed may increase to 160 km per hour, the flashing period will not cut down may more, and that is a point to be proud of the present invention.

I claim:

1. An automatic directional assembly circuit for use in a vehicle, comprising:
   switching means for initiating a directional signal command;
   means for sensing a speed of the vehicle and producing an output indicative thereof; and
   control circuit means coupled to said switching means and to said sensing means, for electrically initiating a flashing sequence signal in response to said directional signal command, said flashing sequence signal persisting for a variable time which varies as a function of said speed of the vehicle,
   wherein the variable time that said flashing sequence signal persists is determined by a time constant circuit which includes: (a) at least one capacitor means for storing charge, (b) resistor means for allowing said stored charge to be discharged in a predetermined time, (c) second capacitor means for storing a charge when said vehicle is at rest and for discharging at a rate which is related to the speed of the vehicle when moving, and (d) switching means for allowing said first capacitor means to discharge only when said second capacitor means is discharged to a voltage level which is within a predetermined range of values.

2. An apparatus as in claim 1, wherein said sensing means includes grounding switch means for coupling to a tachometer of said vehicle and for producing a plurality of grounding signals at a frequency of grounding which is proportional to vehicle speed, said grounding switch means being coupled to said second capacitor means in said control circuit means to thereby reduce the charge on said capacitor means.

3. A device as in claim 2, wherein said grounding switch means includes a rotating shaft having a first surface which is insulating and a second surface which is conducting, said conducting surface being electrically coupled to ground.

4. An automatic directional assembly for use with a vehicle comprising:
   actuating means for commanding one of at least a first and second directional signal states;
   means for sensing a velocity of the vehicle;
   first capacitor means, coupled to said actuating means, for assuming a first commanded charge state when said actuating means has commanded a first directional signal state;
   second capacitor means, coupled to said actuating means for assuming a second commanded charge state when said actuating means has commanded a second directional signal state;
   means, coupled to said sensing means and said first and second capacitor means, for causing one of said capacitor means to assume another charge state different from said commanded charge state at a rate proportional to said velocity of the vehicle;
   first logic gate means coupled to said first capacitor means for outputting a first directional signal when said first capacitor means is in said first commanded charge state;
   second logic gate means coupled to said second capacitor means for outputting a second directional signal when said second capacitor means is in said second commanded charge state; and
   means for indicating said first and said second directional signals.

5. A device as in claim 4, further comprising:
   cross coupling means coupled between said first and said second logic gate means for ensuring that said first and second directional signals from said first and said second logic gate means are not both produced concurrently.

6. A device as in claim 5, wherein said first and said second logic gate means are inverter gates and said cross coupling means includes two diodes, each connected between the input of each gate and the output of each other gate with the cathode of each said diode facing each output.

7. A device as in claim 6, wherein said sensing means includes switching means, coupled to a tachometer of a vehicle so that said switching means rotates at a speed proportional to a rotation of the tachometer, said switching means having at least two surfaces, a first surface which is a conducting surface, and a second surface which is a nonconducting surface.

8. An automatic directional assembly for use with a vehicle comprising:
   actuating means for commanding one of at least first and second directional signal states;
   means for sensing a velocity of the vehicle;
   first capacitor means, coupled to said actuating means, for assuming a first charge state when said actuating means has commanded a first directional signal state;
   second capacitor means coupled to said actuating means for assuming a first charge state when said actuating means has commanded a second directional signal state;
   means, coupled to at least one of said capacitor means and said sensing means, for causing one of said capacitor means to assume another charge state different from said first charge state, at a rate proportional to the speed of the vehicle, after said one of said capacitor means have assumed said first charge state;
   first logic gate means coupled to said first capacitor means for outputting a first directional signal while said first capacitor means is in said first charge state;
   second logic gate means coupled to said second capacitor means for outputting a second directional signal while said second capacitor means is in said first charge state;
   means, coupled to said actuating means, for receiving said first and second directional signals and for indicating said first and said second directional signal states; and
   cross coupling means, coupled between said first and second logic gate means, for ensuring that said first and second directional signals from said first and second logic gate means are not both produced concurrently;

wherein said sensing means includes switching means for coupling to a tachometer of said vehicle so that said switching means rotates at a speed proportional to the rotation of the tachometer, said switching means having at least two surfaces, a first surface which is a conducting surface, and a second surface which is a nonconducting surface.

* * * * *